United States Patent
Fredette

(10) Patent No.: US 7,617,062 B2
(45) Date of Patent: Nov. 10, 2009

(54) DC CURRENT CALCULATION FOR FUEL CELL CONTROL

(75) Inventor: Steven Fredette, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 651 days.

(21) Appl. No.: 10/976,486

(22) Filed: Oct. 29, 2004

(65) Prior Publication Data

US 2006/0093877 A1 May 4, 2006

(51) Int. Cl.
*G06F 19/00* (2006.01)
(52) U.S. Cl. .................................... 702/106
(58) Field of Classification Search ............ 702/60–64, 702/106, 182–185, 188; 324/512
See application file for complete search history.

(56) References Cited

U.S. PATENT DOCUMENTS

| 2004/0126641 A1* | 7/2004 | Pearson et al. ............... 429/34 |
| 2007/0136010 A1* | 6/2007 | Gunn et al. .................. 702/62 |

* cited by examiner

*Primary Examiner*—Edward Raymond
(74) *Attorney, Agent, or Firm*—Bachman & LaPointe, P.C.

(57) ABSTRACT

A process for determining the DC current in a fuel cell power plant includes the steps of determining current value from a power electronics converter of a power conditioning system of the power plant; determining a correction factor based upon losses within the converter; and correcting the current value from the converter with the correction factor to determine DC current in the fuel cell. This process also includes determining voltage within the converter and use of the voltage along with the corrected current to determine the desired DC current value.

6 Claims, 1 Drawing Sheet

$I_{dc} = (P_{acgross} - P_{loss})/V_{dc}$

US 7,617,062 B2

DC CURRENT CALCULATION FOR FUEL CELL CONTROL

BACKGROUND OF THE INVENTION

The invention relates to operation of fuel cell power plants and to control of same.

DC current is typically the means for controlling fuel within commercial and residential power plants. To date, the DC current used for controlling has been measured using a hall effect device. Depending upon the accuracy requirements of the system, a hall effect sensor can be an expensive device. Furthermore, these devices pose problems from a reliability stand point in that moisture can cause the sensor to fail.

The need clearly exists for an improved approach to determining DC current for use in controlling the power plant. It is therefore the primary object of the present invention to provide such a determination, which does not rely upon potentially faulty sensors.

It is a further object of the present invention to accurately determine the DC current while reducing the complexity and cost of the power plant.

Other objects and advantages of the present invention will appear herein below.

SUMMARY OF THE INVENTION

In accordance with the present invention, the foregoing objects and advantages have been readily attained.

According to the invention, a process is provided for determining DC current in a fuel cell power plant, which process comprises the steps of determining current value from a power electronics converter of a power conditioning system of the power plant; determining a correction factor based upon losses within the converter; and correcting the current value from the converter with the correction factor to determine the DC current in the fuel cell. Voltage within the converter is also advantageously determined and can be used according to the invention to determine the DC current in the fuel cell as desired.

In further accordance with the invention, a fuel cell power plant is provided with capacity for measurement of DC current, which comprises a fuel cell power plant; a power conditioning system operatively associated with the power plant and having a power electronics converter; and a control member communicated with the converter for receiving current signal estimating parameters to determine DC current in the power plant.

BRIEF DESCRIPTION OF THE DRAWINGS

A detailed description of preferred embodiments of the present invention follows, with reference to the attached drawings, wherein.

DETAILED DESCRIPTION

Figure 1:
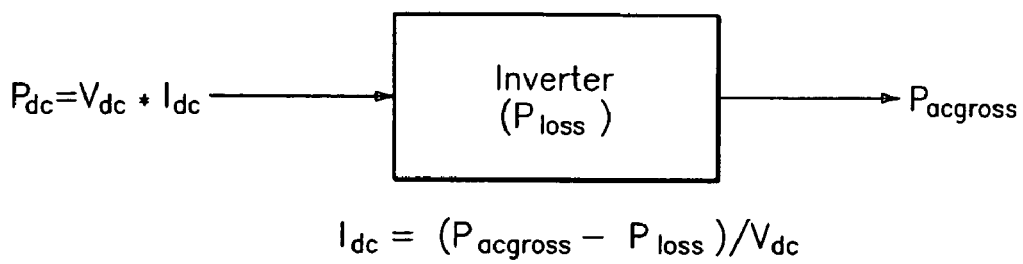
FIG. 1 schematically illustrates measurement of various operating conditions in an inverter, and the correction used to determine actual DC current as desired.

The invention relates to fuel cell power plants and, more particularly, to a process for determining DC current in the fuel cell power plant which can advantageously be used in connection with control of the power plant.

As set forth above, conventional methods for measuring the DC current involve extra sensors which are not reliable and which increase the cost of the power plant.

In accordance with the present invention, measurements are used which are already taken using a power electronics converter, such as an inverter, within a power conditioning system of the power plant. These measurements can be corrected so as to obtain the desired measurement, without any additional equipment, thereby increasing reliability of the power plant and reducing the part count and cost of same.

In accordance with the present invention, it has been found that an accurate determination of DC current can be obtained by correcting a gross power from the inverter for losses within the inverter so as to obtain a value representative of the desired DC current measurement. This value can then be used with DC link voltage values to determine the desired DC current value. Converters can have AC output or DC output, and the system and process of the invention are useful in both systems. For AC output converters, the gross AC power (Pacgross) from the converter is used. For a converter whose output is DC, DC current can be obtained by correcting a gross DC power measured by the converter.

Correction for losses within the inverter advantageously allows for a sufficiently accurate determination of DC current that control of the power plant can be made based upon this measurement, while completely avoiding the need for complex, expensive and unreliable sensors as have been needed conventionally.

According to the invention, DC current is calculated within the power conditioning system (PCS) or, alternatively, within a power plant controller (PPC), each of which contains or can contain values from measurements of parameters which can lead to the desired DC current without any additional equipment. In accordance with the present invention, it has been found that the parameters measured by these systems can be corrected to provide the desired measurement, and that such correction provides for sufficiently accurate results as desired.

The correction is based upon a modified conservation of power algorithm, wherein the power into the converter, for example a PCS inverter, equals power out of the PCS inverter minus losses due to the inverter.

In accordance with the invention, the correction or calculations applied for an AC output system are as follows:

$$Idc = (Pacgross - Ploss)/Vdc, \text{ wherein}$$

Pacgross is gross ac power from the inverter;
Vdc is dc link voltage measured by the inverter; and
Ploss is losses within the inverter as a function of operating parameters. Similar calculations can be made for a DC system.

Thus, generic to both types of converters, DC current in the fuel cell (Idc) can be determined as follows:

$$Idc = (Pgross - Ploss)/Vdc, \text{ wherein}$$

Pgross is gross power from the converter;
Vdc is dc link voltage measured by the converter; and
Ploss is losses within the converter as a function of operating parameters.

The Pgross value, or current from the converter, is a measurement typically and readily available with known converters. Ploss is determinable empirically, if necessary, or may be information provided with the converter, but in any event is determinable without additional sensing equipment. Vdc is also typically determined with known converters, and is therefore also available without the need for additional sensors and the like.

FIG. 1 also schematically illustrates this correction, and shows an inverter with an inherent Ploss factor. The losses experienced in an inverter at a particular operating level can readily be determined and formulated into information which can be quickly obtained in the course of the process of the present invention. For example, this data can be gathered and assembled into a look-up-table, or a series of look-up-tables, and/or this data can be stored in a database accessible to the control unit which is carrying out the process of the present invention. Thus, based upon a combination of parameters measured and/or provided by the inverter and data from the look-up-table, the desired DC current value measurement can readily be determined.

The calculation of DC current in accordance with the present invention advantageously eliminates part count, reduces cost of the power plant, and improves reliability of the power plant due to removal of a part which has a tendency to fail. The part count reduction not only includes the no longer needed current sensor, but also extends to a reduction in the fraction of power supply used to power the sensor, the signal conditioning and interface circuitry required to convert the sensor output into useable information for the controller, and wiring required to transmit the power and signal to and from the sensor.

Figure 2:
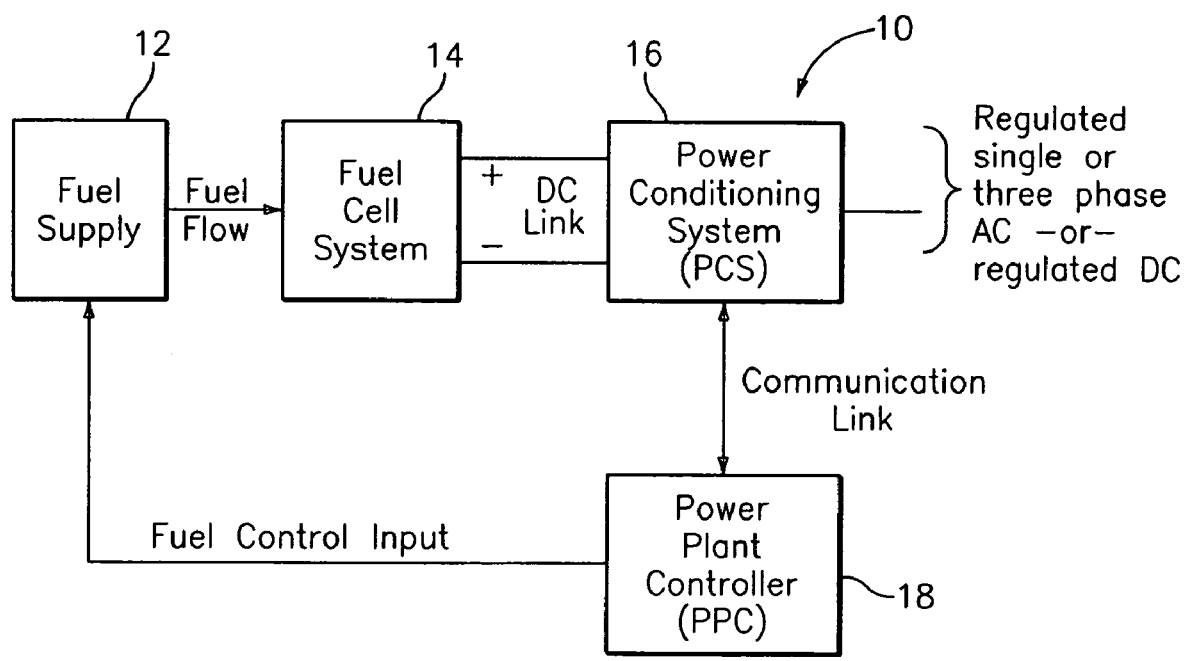
FIG. 2 schematically illustrates a fuel cell power plant with DC current measurement in accordance with the present invention.

Referring now to FIG. 2, a system according to the invention is schematically illustrated. FIG. 2 shows system 10 including a fuel supply 12, a fuel cell system 14, a power conditioning system (PCS) 16, a power plant controller (PPC) 18, and various operative communications between these components. PCS 16 can be used to generate a regulated, single or three phase AC or regulated DC current which forms the basis of the determination according to the invention. In the system of FIG. 2, the PPC 18 generates the signal from which the determination in accordance with the present invention is made. Of course, the method of the invention can be adapted to other systems as well, and the system schematically illustrated in FIG. 2 is a non-limiting example of a system according to the invention.

A control unit, in this instance distributed between PCS 16 and PPC 18, is adapted to make the determination of Idc from the information available as set forth above. This control unit receives signal estimating parameters such as the current value from the converter, losses correction factor and voltage within the converter, and uses these parameters to determine the desired DC current value in the fuel cell. Of course, the control unit can be integrated within any of the aforesaid components, or separately added to existing components, all well within the broad scope of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for determining DC current (Idc) in a fuel cell power plant, comprising the steps of:
    determining current value from a power electronics converter of a power conditioning system of the power plant;
    determining a correction factor value based upon losses within the converter; and
    correcting the current value from the converter with the correction factor to determine the DC current in the fuel cell, wherein the correcting step comprises the following calculation:

$Idc=(Pgross-Ploss)/Vdc$, wherein

Pgross is gross power from the converter;
    Vdc is dc link voltage into the converter; and
    Ploss is losses within the converter as a function of operating parameters.

2. The process of claim 1, wherein the step of determining the current value comprises measuring gross power from the converter, and wherein the correcting step comprises correcting the gross power for losses within the converter to provide a corrected current, and determining the DC current from the corrected current and link voltage into the converter.

3. A fuel cell power plant system with measurement of DC current, comprising:
    a fuel cell power plant;
    a power conditioning system operatively associated with the power plant and having a power electronics converter; and
    a control member communicated with the converter for receiving current signal estimating parameters to determine DC current in the power plant, wherein the control member is adapted to receive a signal of current value from the converter and a correction factor representative of losses within the converter, and to determine DC current (Idc) in the power plant therefrom, and wherein DC current (Idc) is determined according to the following:

$Idc=(Pgross-Ploss)/Vdc$, wherein

Pgross is gross power from the converter;
    Vdc is dc link voltage into the converter; and
    Ploss is losses within the converter as a function of operating parameters.

4. A fuel cell power plant system with measurement of DC current, comprising:
    a fuel cell power plant;
    a power conditioning system operatively associated with the power plant and having a power electronics converter; and
    a control member communicated with the converter for receiving a current signal that defines the DC current in the power plant, wherein the control member is adapted to receive a signal of current value from the converter and a correction factor representative of losses within the converter, and to determine DC current (Idc) in the power plant therefrom, and wherein the DC current (Idc) is determined as follows:

$Idc=(Pgross-Ploss)/Vdc$, wherein

Pgross is gross power from the converter;
    Vdc is dc link voltage into the converter; and
    Ploss is losses within the converter as a function of operating parameters.

5. The process of claim 1, further comprising the step of using the determination of DC current in the fuel cell as a fuel control input to a fuel supply for the fuel cell power plant.

6. The system of claim 4, further comprising a fuel supply for supplying fuel to the fuel cell power plant, wherein the control member is also communicated with the fuel supply to provide fuel control input to the fuel supply based upon the current signal received by the control member.

* * * * *

UNITED STATES PATENT AND TRADEMARK OFFICE
CERTIFICATE OF CORRECTION

PATENT NO.       : 7,617,062 B2                                    Page 1 of 1
APPLICATION NO. : 10/976486
DATED            : November 10, 2009
INVENTOR(S)      : Steven J. Fredette It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Nineteenth Day of October, 2010

David J. Kappos
*Director of the United States Patent and Trademark Office*